(12) United States Patent
McDaniel et al.

(10) Patent No.: US 7,817,662 B2
(45) Date of Patent: *Oct. 19, 2010

(54) SYSTEM AND METHOD FOR INTERFACING WITH A MANAGEMENT SYSTEM

(75) Inventors: Scott S. McDaniel, Villa Park, CA (US); Steven B. Lindsay, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 12/190,425

(22) Filed: Aug. 12, 2008

(65) Prior Publication Data

US 2008/0307078 A1    Dec. 11, 2008

Related U.S. Application Data

(63) Continuation of application No. 10/797,532, filed on Mar. 10, 2004, now Pat. No. 7,411,973.

(60) Provisional application No. 60/453,642, filed on Mar. 11, 2003.

(51) Int. Cl.
*H04L 12/26* (2006.01)

(52) U.S. Cl. ...................... 370/463; 370/419

(58) Field of Classification Search ............... 370/419, 370/463, 359, 206, 217, 218, 219, 220
See application file for complete search history.

(56) References Cited

U.S. PATENT DOCUMENTS

| 6,678,369 | B2* | 1/2004 | DeMent et al. ........ 379/221.03 |
| 6,757,725 | B1 | 6/2004 | Frantz et al. |
| 6,795,933 | B2* | 9/2004 | Wachel ........................ 714/4 |
| 6,965,558 | B1* | 11/2005 | Hann ........................ 370/216 |
| 7,391,719 | B2* | 6/2008 | Ellis et al. ................... 370/219 |
| 2002/0016861 | A1 | 2/2002 | Simonoff |
| 2002/0165978 | A1 | 11/2002 | Chui |
| 2003/0023559 | A1 | 1/2003 | Choi et al. |
| 2003/0058800 | A1 | 3/2003 | Goodman et al. |
| 2003/0099305 | A1 | 5/2003 | Yi et al. |
| 2003/0119555 | A1 | 6/2003 | Friesen et al. |
| 2003/0122683 | A1 | 7/2003 | Downer |
| 2003/0179712 | A1 | 9/2003 | Kobayashi et al. |
| 2004/0100964 | A1 | 5/2004 | Robotham et al. |
| 2004/0156350 | A1 | 8/2004 | Brasic et al. |
| 2007/0233455 | A1 | 10/2007 | Zimmer et al. |

* cited by examiner

*Primary Examiner*—Brian D Nguyen
(74) *Attorney, Agent, or Firm*—McAndrews, Held & Malloy, Ltd.

(57) ABSTRACT

Systems and methods that interface with a management system are provided. In one embodiment, a system and a method may provide a command protocol and format for communication between a network interface card (NIC) and a management device such as, for example, an intelligent management device (IMD). An interface may be adapted to allow the management device to merge its traffic with that of the NIC to provide a fully integrated management solution. The fully integrated management solution may be implemented, for example, without additional network connections.

30 Claims, 6 Drawing Sheets

SYSTEM AND METHOD FOR INTERFACING WITH A MANAGEMENT SYSTEM

CROSS-REFERENCE TO RELATED APPLICATIONS

The present application is a CONTINUATION of U.S. application Ser. No. 10/797,532, filed Mar. 10, 2004, now U.S. Pat. No. 7,411,973. Said U.S. application Ser. No. 10/797,532 claims benefit from and priority to U.S. Application No. 60/453,642, filed Mar. 11, 2003. The above-identified applications are hereby incorporated herein by reference in their entirety.

INCORPORATION BY REFERENCE

The above-referenced United States patent application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

FIG. 1 illustrates a block diagram of a system 10 connected to a network 20 via switches 30a, 30b. The system 10 includes a network interface card (NIC) 40 and an intelligent management device (IMD) 50. The NIC 40 is connected to the switch 30a and to a host (not shown) of the system 10. The IMD is connected to the switch 30b and to the host of the system 10. The NIC includes a NIC media access control (MAC) 60 and a NIC processor 70. The network 20 is connected to the switch 30a which, in turn, is connected to the NIC MAC 60. The NIC MAC 60 is connected to the NIC processor 70 which, in turn, is connected to the host of the system 10. The IMD 50 includes a MAC 80 and management processor 90. The network 20 is also connected to the switch 30b which, in turn, is connected to the MAC 80. The MAC 80 is connected to the management processor 90 which, in turn, is connected to the host of the system 10.

The IMD 50 provides, for example, monitoring, management capabilities and remote functionality. For example, the IMD 50 can provide monitoring and management capabilities for the system 10 and can provide remote functionality to or from a device (e.g., a remote device) connected to the network 20.

The IMD 50 can have one or more of the following disadvantages. For example, as illustrated in FIG. 1, the system 10 includes an additional dedicated connection to the network 20. Besides the additional cost (e.g., the additional switch 30b) of implementing another system port, the IMD 50 is susceptible to a failure, for example, of the switch 30b. Thus, if switch 30b were to fail, then the IMD 50 would no longer be accessible via the network 20. Furthermore, because the IMD 50 is connected to the network 20, the IMD 50 may be needlessly processing some packets carried on the network 20. On high-speed networks, in particular, the resources of the IMD 50 can be substantially consumed by such unnecessary processing, thereby reducing some resources of the IMD 50 that could have been allocated for other tasks. For example, some packets (e.g., packets that can be forwarded as received) may be processed by the IMD 50, even though these packets need not be processed by the IMD 50.

Further limitations and disadvantages of conventional and traditional approaches will become apparent to one of ordinary skill in the art through comparison of such systems with one or more aspects of the present invention as set forth in the remainder of the present application with reference to the drawings.

BRIEF SUMMARY OF THE INVENTION

Aspects of the present invention may be found in, for example, systems and methods that interface with a management system such as, for example, an intelligent management device. In one embodiment according to some aspects of the present invention, a communications system may include, for example, a network interface card (NIC) and a management device. The management device may be coupled to the NIC. The NIC may be adapted, for example, to merge communications traffic of the management device with the NIC.

In another embodiment according to some aspects of the present invention, a communications system may include, for example, a first NIC, a second NIC and a manager. The first NIC and the second NIC may be coupled to a network. The manager may be coupled to the first NIC and the second NIC. The manager may initially be in two-way communications with the network via the first NIC. However, if the first NIC fails, then the manager may switch from the first NIC to the second NIC and be in two-way communications with the network via the second NIC.

In yet another embodiment according to some aspects of the present invention, a method of communications may include, for example, one or more of the following: providing access to and from a network for a management device via a NIC; configuring one or more filters of the NIC via one or more commands generated by an management device; filtering incoming packets via the one or more filters; and forwarding the filtered packets based upon one or more matches between information carried by the filtered packets and one or more filtering parameters.

In yet another embodiment according to some aspects of the present invention, a method of communications between a NIC and a management device may include, for example, one or more of the following: generating a command in the management device, the command comprising a particular sequence number; storing the command in the management device; sending the command to the NIC; executing the command in the NIC; and generating a response to the command, the response comprising the particular sequence number. In some embodiments according to the present invention, the command may also include, for example, an identifier-type field and a command structure. The response may also include, for example, an identifier-type field and a response structure.

In yet still another embodiment according to some aspects of the present invention, a method of remote management over a network may include, for example, one or more of the following: accessing the network via a plurality of NICs of a local server system; communicating between a local manager of the local server system and a remote manager over the network through a NIC selected by the local manager, the selected NIC being one of the plurality of NICs; managing the local server system via the local manager; and responding locally to management commands sent over the network from the remote manager.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention may be found, for example, in systems and methods that interface with a management system such as, for example, a management system including an intelligent management device (IMD). In some embodiments according to the present invention, a command protocol and format for communication between an interface card (e.g., a network interface card (NIC), a controller, an adapter, etc.) and a management system may be provided.

In some embodiments according to the present invention, an interface that may allow a management system to merge its traffic with that NIC (e.g., a standard NIC, a network interface controller, etc.) to provide a fully integrated management solution may be provided. The fully integrated management solution may be implemented, for example, without adding further network connections.

In some embodiments according to the present invention, a separate Ethernet connection port on a NIC may be provided. The separate Ethernet connection port may be, for example, a universal management port (UMP). Via this interface, a management system may see packets that it would see if it were directly connected to the network as well as many other types of packets (e.g., commands, responses, etc.)

In some embodiments according to the present invention, a system that passes command packets over an Ethernet interface between a management system and an UMP may be provided.

Figure 1:
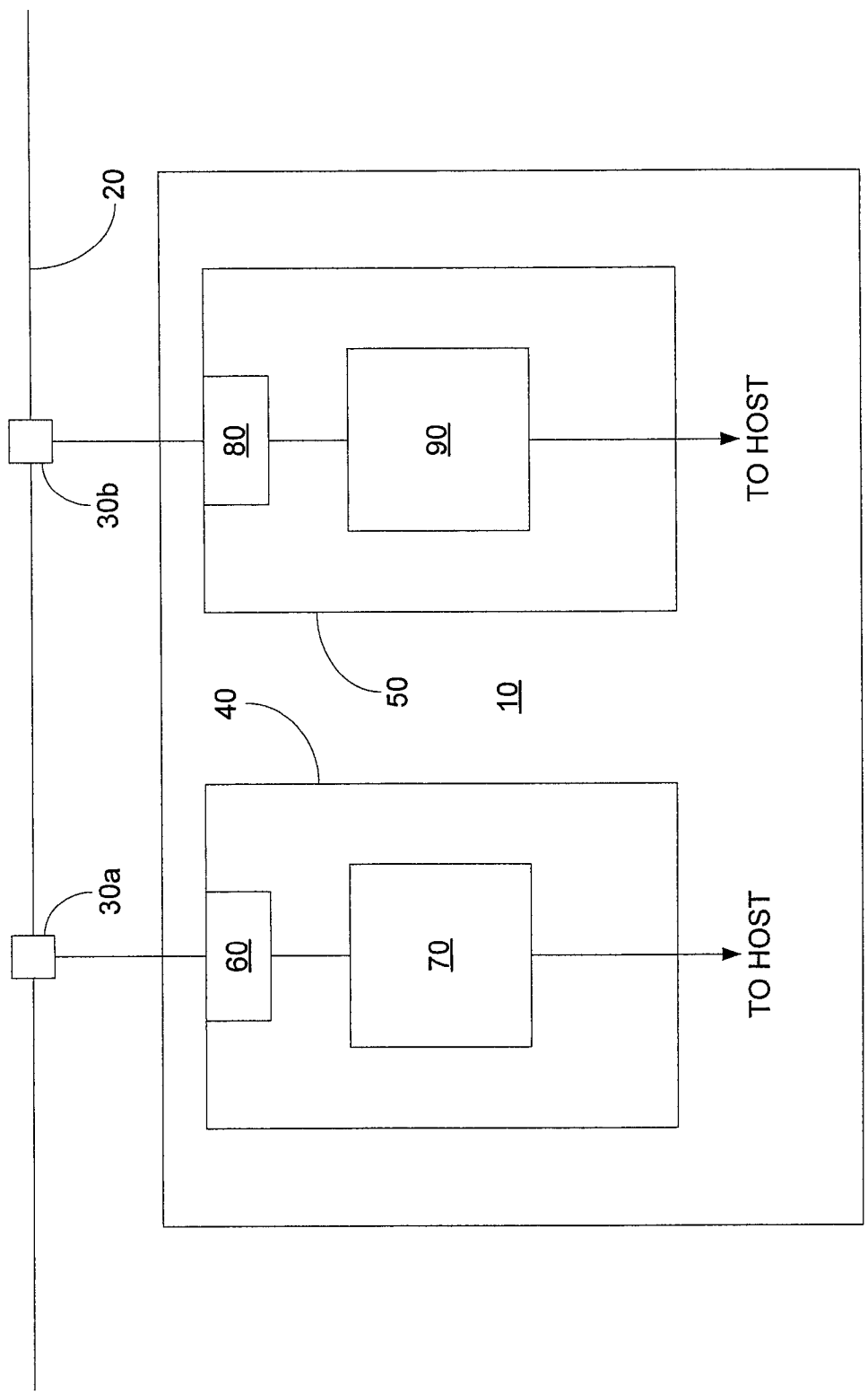
FIG. 1 shows a block diagram of a system connected to a network via switches.
Figure 2:
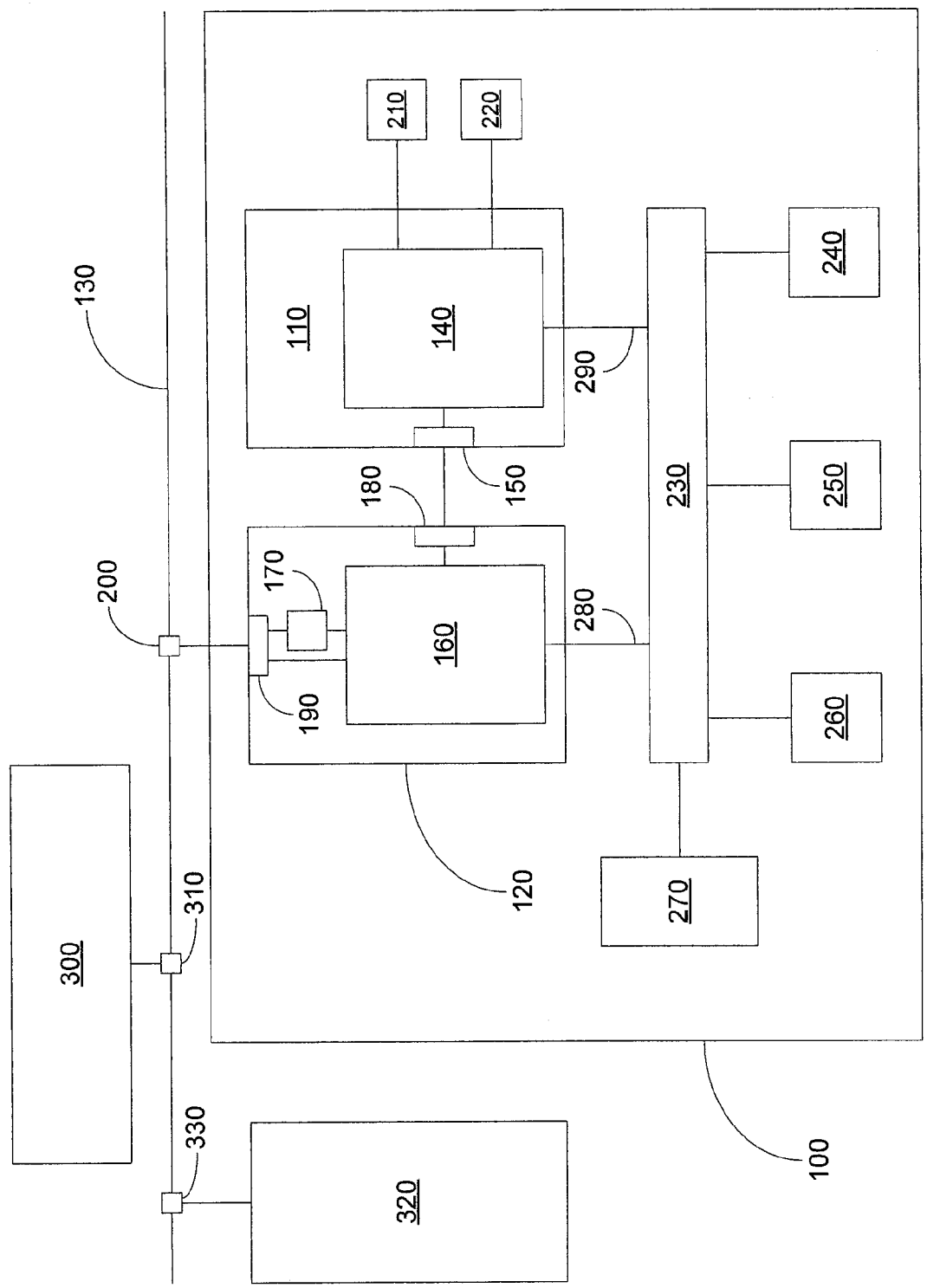
FIG. 2 shows a block diagram of a system coupled to a network according to an embodiment of the present invention.

FIG. 2 shows an embodiment of a system 100 including an IMD 110 according to the present invention. The system 100 may be, for example, a server system, a server blade, a desktop system, a computer system, a network system, a set top box, etc.) The system 100 may include, for example, the IMD 110 and a NIC 120. The system 100 may be coupled to a network 130 via the NIC 120. The IMD 110 may include, for example, a management processor 140 and a media access control (MAC) 150 (e.g., a 10/100 MAC). The NIC 120 may include, for example, a NIC processor 160, a set of filters 170, a MAC 180 (e.g., a 10/100 MAC or UMP) and a main NIC MAC 190. The management processor 140 may be coupled to the MAC 150 which, in turn, may be coupled to the MAC 180. The MAC 180 may be coupled to the NIC processor 160 which, in turn, may be coupled to the main NIC MAC 190.

The NIC processor 160 may also be coupled to the set of filters 170 which, in turn, may be coupled to the NIC MAC 190. The main NIC MAC 190 may be coupled to the network 130 via a switch 200.

The system 100 may also include, for example, system sensors 210, system controls 220, a system interconnect 230, a central processing unit (CPU) 240, another CPU 250, a system storage device 260 (e.g., a system memory) and peripheral devices 270 (e.g., disk devices, video devices, etc.) The system sensors 210 and the system controls 220 may be coupled to the IMD 110 and, in particular, may be coupled to the management processor 140. The NIC 120, the IMD 110, the CPUs 240, 250, the system storage device 260 and the peripheral devices 270 may each be coupled to the system interconnect 230. In particular, the NIC processor 160 and the management processor 140 may be coupled to the system interconnect 230 via a first host connection 280 and a second host connection 290. The host connections 280, 290 may be, for example, peripheral component interconnects (PCIs).

Other devices may be coupled to the network 130. For example, a management console 300 may be coupled to the network 130 via a switch 310. Other systems 320 may be coupled to the network via respective switches 330. Although illustrated as a single switch 330, each respective system 320 may include its own respective switch or switches 330. Some of the other systems 320 may be identical to the system 100 illustrated in FIG. 2 and some of the other systems 320 may be identical to the system 100 illustrated in FIG. 3. However, the other systems 320 need not be so limited in scope. In some embodiments, some of the other systems 320 and the system 100 may be remotely controlled (e.g., remotely monitored, remotely activated, remotely managed, remotely accessed, etc.) by the management console 300.

Figure 3:
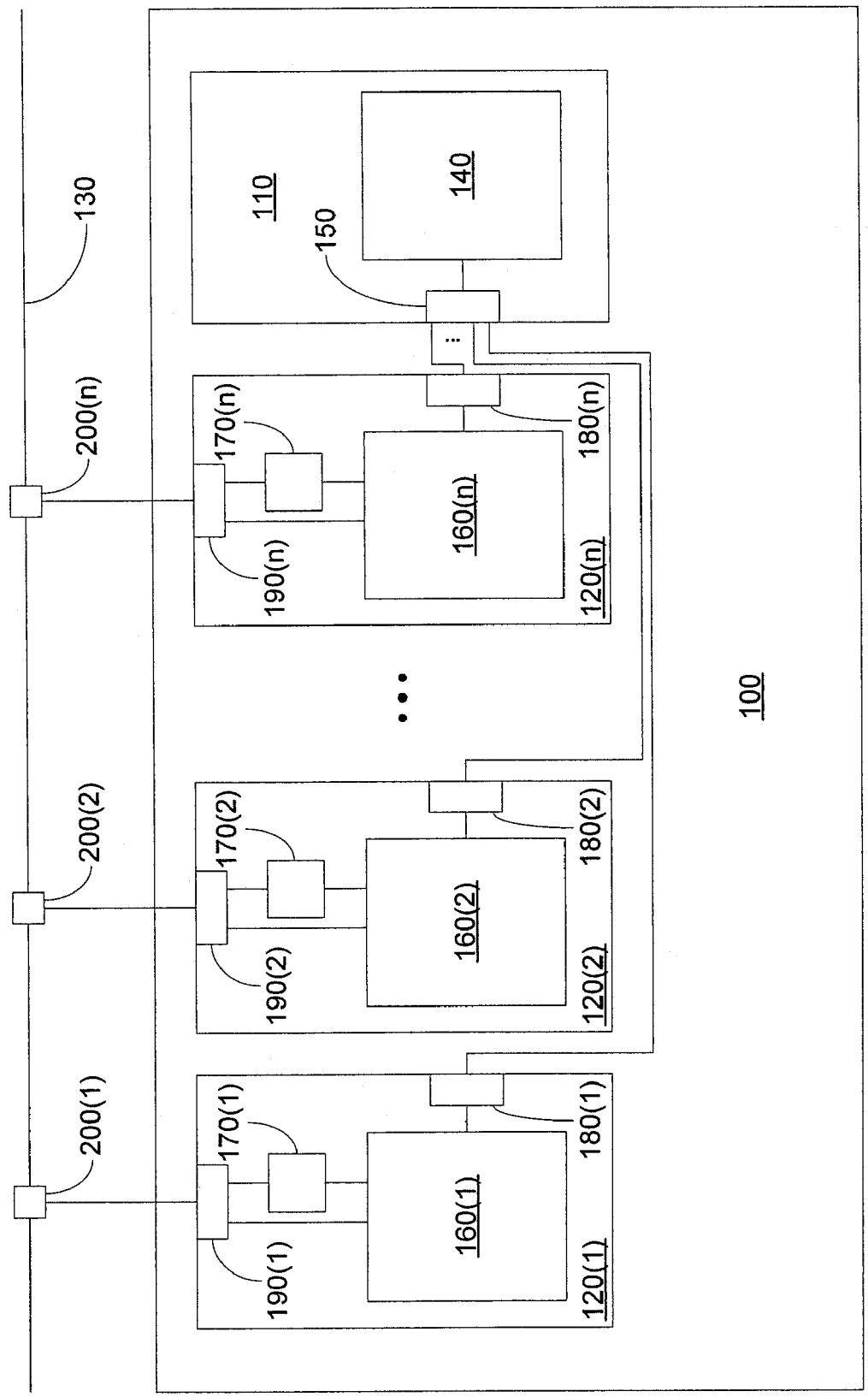
FIG. 3 shows a block diagram of a system coupled to a network according to an embodiment of the present invention.

FIG. 3 shows an embodiment of the present invention in which the system 10 is coupled to the network 130 via a plurality of NICs 120 (i.e., NIC 120(1), NIC 120(2), ..., NIC 120(n), where n is an integer value). Each NIC 120 may include, for example, a respective NIC processor 160, a set of filters 170, a first MAC 180 and a second MAC 190. Each NIC 120 may be coupled to the network 130 via a respective switch 200. The various components may be coupled together as described above with respect to the NIC 120 of FIG. 2. In addition, each NIC 120 may be coupled to the IMD 110. In one embodiment, the second MACs 190 of the respective NICs 120 each may be coupled to the MAC 150 of the IMD 110.

In operation and with reference to FIG. 2, the management console 300 may be in two-way communications with the system 100 and some of the other systems 320 coupled to the network 130. The management console 300 may provide, for example, management services (e.g., remote management services) for the system 100 and some of the other systems 320. Thus, the management console 300 may be able to pull up graphical user interfaces (e.g., windows) on its display for each of the systems that the management console 300 manages. In some embodiments, the activities performed via the management console 300 may appear seemless even though the systems being managed may be far way.

The IMD 110 may be in two-way communications with the management console 300 (e.g., a remote management console) via network 130. The management console 300 may be in two-way communications with not only the IMD 110 of the system 100, but also some of the other systems 320 coupled to the network 130. In some embodiments according to the present invention, the IMD 110 may be in two-way communications with the management console 300 only through the NIC 120. In various embodiments according to the present invention, the IMD 110 may not have its own direct connection to the network 130, but instead may use the NIC 120 to access the network. The IMD 110 may provide management services for the system 100. For example, the IMD 110 may monitor the system sensors 142 or adjust the system controls 144. Thus, for example, the IMD 110 may monitor power supply parameters, voltage parameters, current parameters, temperature parameters, status parameters, failure parameters of various components and circuits. The system sensors 142 may also provide alerts to the IMD 110 such as, for example, that the cover of the system 100 has not been replaced, that components have been removed or failed, or that the temperature in the system 100 has exceeded particular thresholds. The IMD 110 may also adjust, activate or set system controls 144 in response to monitored parameters or in response to particular commands or requests. For example, the IMD 110 may reset power settings or parameters settings, power up the system 100 or a particular component of the system 100, or power down the system or a particular component of the system 100.

In addition to responding to current conditions, the IMD 110 may also respond to requests received from the host of the system 100 or from the network 130. In some embodiments according to the present invention, the IMD 110 may receive requests or commands from the management console 300. In various embodiments according to the present invention, the management console 300 may provide, for example, a user input device (e.g., a keyboard, a mouse, etc.) and a user output device (e.g., a display, a graphical user interface, a video output, a graphical output, an audio output, etc.) By opening up a window in a display, a user located at the management console 300 may monitor information that the IMD 110 may be receiving from the system sensors 210 or the system controls 220 or other components of the system 100. The user may then send commands or requests to the IMD 110 to which the IMD 110 may respond. For example, the management console 300 may send a request for information to the IMD 110. The request may be sent via the network 130 to the NIC 120. The request may be routed through the filters 170 which may determine whether or not the request is destined for the IMD 110. If the request had not been destined for the IMD 110, then, for example, it may have been forwarded to the NIC processor 160 or to the host of the system 100 or elsewhere for further processing. If the request is destined for the IMD 110, then the NIC 120 may route the request to the IMD 110. Thus, in some embodiments according to the present invention, the IMD 110 may only receive requests or commands or data packets that are destined for the IMD 110.

The IMD 110 may then analyze the request and may perform the request. For example, the request may include commands for powering down an overheated component. The IMD 110 may thus adjust one or more of the system controls 144 of the system 100. The IMD 110 may then send a response to the management console 300 through the NIC 120 and the network 130. The response may include, for example, graphical information for display on a monitor that the user is viewing. Thus, user seemlessly manages the IMD 110 as if the user were located at the system 100. In some embodiments, the management console 300 may act as a dummy terminal in which keyboard strokes or other input commands (e.g., mouse interface information) are relayed to the IMD 110 which, in turn, then may send graphical information to the management console 300 which may be displayed on the monitor as alphanumeric symbols (or, for example, cursor movements) corresponding to the keystrokes (or, for example, mouse movements).

Referring to FIG. 3, the IMD 110 may be coupled to a plurality of NICs 120. In some embodiments according to the present invention, only one of the plurality of NICs 120 provides access to and from the network 130 for the IMD 110. The IMD 110 may select which of the NICs 120 to use as a sole connection to and from the network 130. In some embodiments according to the present invention, the IMD 110 may have the ability to switch between using one NIC or another NIC as the sole connection to and from the network 130, for example, at different times. This ability may enhance throughput as well as promote fault tolerance. For example, if the selected NIC is being overused by other resources of the system 100 or the network 130, then the IMD 110 may select another NIC (e.g., a NIC that is not being overused by other resources of the system 100 or the network 130). In another example, if the selected NIC has failed or has been removed from the system 100, then the IMD may select another NIC to provide a connection (e.g., a sole connection) to and from the network 130. Furthermore, if the management console 300 determines that the selected NIC has failed or has been removed from the system 100, the management console 300 may wait and try again or the management console 300 may broadcast the information to the other NICs of the system 100. The IMD 110 may then be notified via the broadcasted information received from one or more of the other NICs of the system and switch to another NIC. The IMD 110 may then use the newly selected NIC to inform the management console 300 of the switch in NIC selection.

In some embodiments according to the present invention, the system 100 may allow, for example, the IMD 110 to merge its traffic with that of the NIC 120. The system 100 may provide, for example, a fully integrated management solution that does not necessitate additional network connections. The NIC 120 may transmit, for example, non-command packets via the main NIC MAC 190. The NIC 120 may receive, for example, packets via the main NIC MAC 190 and send the received packets through the set of filters 170. The set of filters 170 may allow received packets to be passed to the IMD 110 if, for example, the received packets meet (e.g., match) at least some of the filter requirements (e.g., programmed filter parameters). The NIC 120 may receive packets from the IMD 110 that meet a particular encapsulation format and may process the packets locally. The NIC 120 may receive other types of packets from the IMD 110 that may be transmitted exactly as they were received from the IMD 110 including, for example, virtual local area network (VLAN) tag information.

Figure 4:
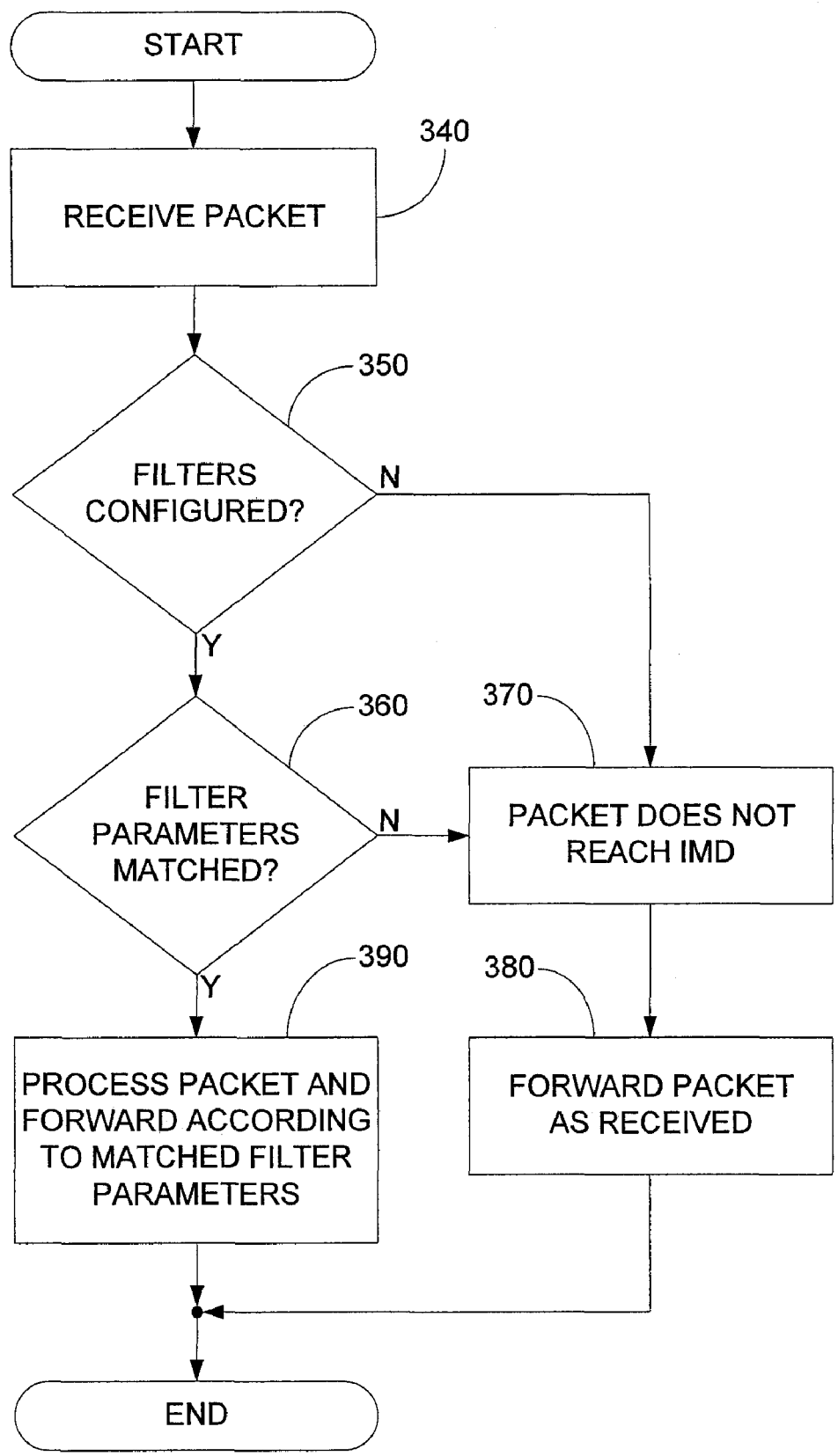
FIG. 4 shows a flowchart illustrating an embodiment of a process for receiving and forwarding packets according to the present invention.

FIG. 4 shows a flowchart illustrating an embodiment of a process for receiving and forwarding packets according to the present invention. In step 340, the system 100 may receive packets from the network 130 via the main NIC MAC 190. In query 350, whether the set of filters 170 are operable may be based upon whether the set of filters 170 have been configured. The set of filters 170 may be configured, for example, via commands generated by the NIC processor 160 of the NIC 120 or the management processor 140 of the IMD 110. If the set of filters 170 have been configured, then, in query 360, it is determined whether the information carried by the packet satisfies (e.g., matches) one or more of the configured filter parameters. If the information carried by the packet does satisfy one or more of the configured filter parameters, then, in step 390, the packet may be processed by the NIC processor 160 and the management processor 140 and forwarded to a destination according to the matched filter parameters. In one embodiment, with regard to layer 2 (L2) address values, the NIC 120 may forward data that may meet, for example, any of the selected perfect match filters, for example, for the L2 address. In another embodiment, the NIC 120 may limit forwarded traffic up to a particular number of VLAN networks. In yet another embodiment, the NIC 120 may filter L2 multicast or broadcast traffic and forward such traffic accordingly. In one embodiment, a broadcast packet that is determined to be an address resolution protocol (ARP) packet or other specific types of broadcast packets may be forwarded accordingly.

If the set of filters are not configured (query 350) or if the information carried by the packet does not satisfy any of the configured filter parameters (query 360), then, in step 370, the packet may not reach the IMD 110. In step 380, the packet may be forwarded as received by the main NIC MAC 190 to the rest of the system 100. In one embodiment, if the packets are not filtered, the receive (RX) packets including, for example, VLAN tag information may be forwarded as received via the main NIC MAC port 190.

In some embodiments, the present invention may provide command packets and/or response packets transmitted and/or received by the NIC 120 having a format as set forth below. For example, the commands may be from the IMD 110 to the NIC 120 and the responses may be from the NIC 120 to the IMD 110.

| Byte | 31 | 23 | 15 | 7 |
|---|---|---|---|---|
| 0 | XXXX | XXXX | DA | DA |
| 4 | DA | DA | DA | DA |
| 8 | SA | SA | SA | SA |
| 12 | SA | SA | BRCM Num. | |
| 16 | 0x5706 | | Cmd. Seq. Num. | |
| 20 | Cmd. Type | | Data Length | |
| 24 | Data0 | Data1 | Data2 | Data3 |
| 28 | Data4 | Data5 | Data6 | Data7 |
| ... | ... | ... | ... | ... |
| ... | DataN | | Optional Padding to 32 bits | |
| ... | | 2s Complement Checksum Compensation | | |
| ... | | Optional Zero Pad to 64 Byte Legal Ethernet Frame | | |

In some embodiments, the present invention may provide for fields with definitions as set forth below.

XXXX Padding for the purposes of this table to make protocol values align on the 32-bit rows. These bytes may not be a part of any packet.

DA Ethernet Destination Address. Value is configurable, but typically is equal to the address the receiver represents on the main interface.

SA Ethernet Source Address. Value is configurable, but typically is equal to the address the sender represents on the main interface.

BRCM Number
  Well-known IEEE packet type number.

0x5706 Packet type number used to define a packet sub-type for the BRCM number.

Cmd Type Command Type. When bit 15 of the type is set, it indicates a response packet sent from the NIC to the IMD.

Data Length
  This value is the length in bytes of the data payload of the command packet. This is the number of "Data" bytes in the packet. This count may not include this value or any bytes before this value. This count may not include any Padding or Checksum bytes. The checksum may sum bytes not in this count if this count is not a multiple of four.

Data . . . Command payload.

Optional Padding to 32-bits
  If the Data portion of the command is not a multiple of four in length (i.e., Bottom two bits of Data Length field are not zero) then from one to three bytes of zero value padding may be added so that the 2's complement checksum may be calculated over full 32-bit values.

2s Complement Checksum Compensation
  When this value is added to the 2's complement sum of all the 32-bit words in the "Data" and "Optional Padding" areas, the resulting value may be 0xffffffff. The checksum checking may optionally be disabled at each receiver. The sender may then take advantage of this by setting this value to 0xffffffff.

Optional Zero Pad to 64 Byte Legal Ethernet Frame
  For frames to be compliant with IEEE 820.3, all frames are padded up to a total of 64 bytes. This is typically done automatically by most Ethernet MAC devices.

In some embodiments, the present invention may provide that command frames may not use additional L2 encapsulation techniques such as, for example, VLAN, SNAP, etc.

In some embodiments, the present invention may employ a transport mechanism by which reliable reception of control frames may be tracked via sequence numbers. Each command packet may be associated with a respective response packet by each carrying a common sequence number in a particular sequence number space. Accordingly, the same sequence number space may be used for command/response packets in either direction between the NIC 120 and the IMD 110.

Figure 5:
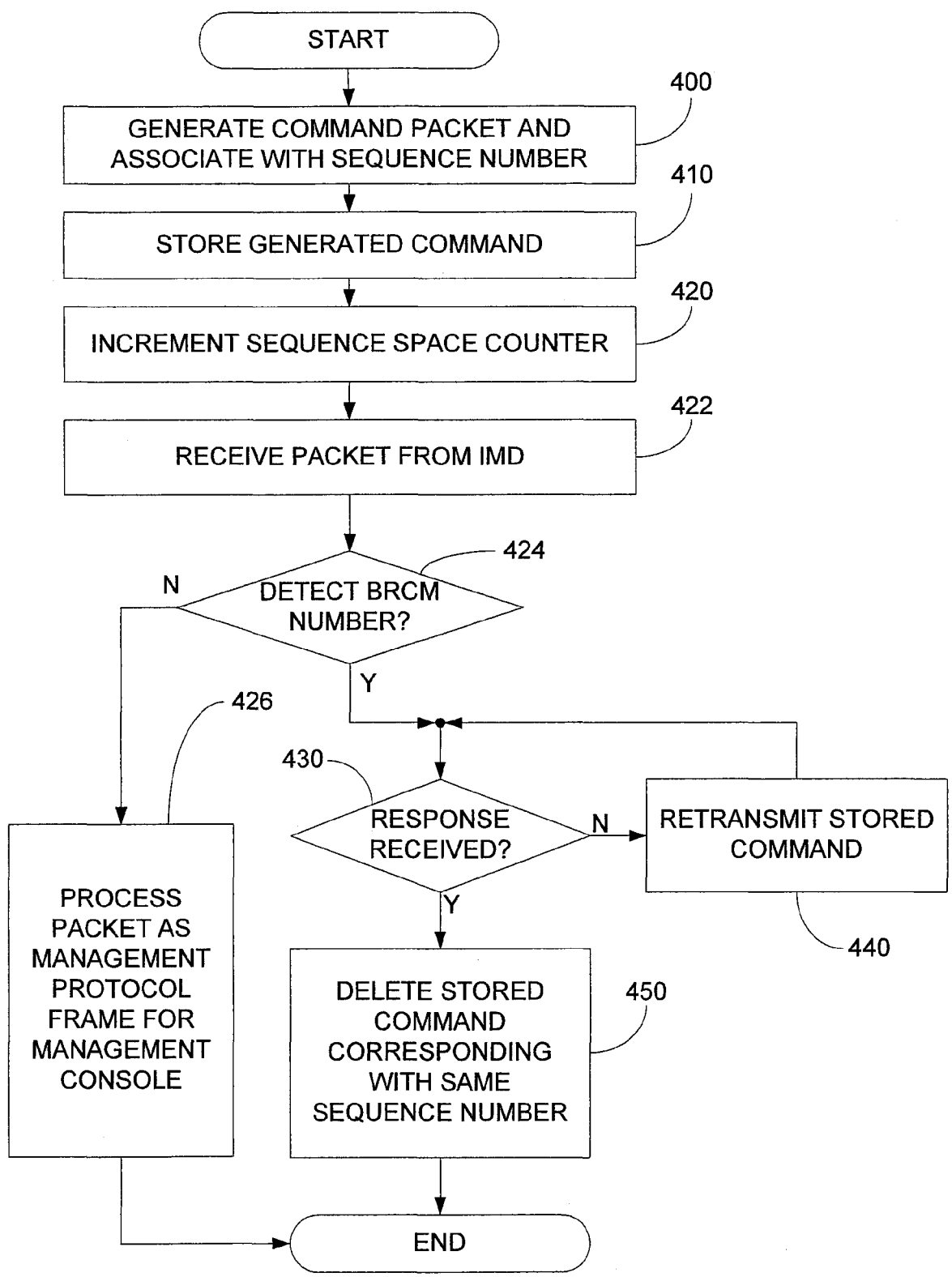
FIG. 5 shows a flowchart illustrating an embodiment of a process for handling command packets according to the present invention.

FIG. 5 shows a flowchart illustrating an embodiment of a process for handling command packets according to the present invention, for example, as executed by the IMD 110. In step 400, a sender of a command (e.g., the IMD 110) may generate a command packet. The command packet may include, for example, a sequence number with which the command packet is associated. In step 410, the sender of the command may then store the generated command. In step 420, the sequence space counter of the sender may then be incremented. In one embodiment, the step 420 may proceed step 400 and step 410. In another embodiment, the command is sent from the IMD 110 to the NIC 120. The NIC 120 may respond to the command with a response. In step 422, the NIC 120 may receive a packet from the IMD 110. In query 424, a BRCM number may be detected in a particular field (e.g., an identifier-type field). If the BRCM is not detected, then, in step 426, the packet may be processed as a management protocol frame for the management console 300. If the BRCM is detected, then query 430 follows. In query 430, if sender of command receives a response, then, in step 450, the command corresponding to the received response may be deleted from storage. In one embodiment, the received response may include, for example, a particular sequence number associated with a particular command, thereby identifying the stored command which can be deleted.

If a response to a particular command is not received, then, in step 440, the particular command, which has been stored, may be retransmitted. In one embodiment, the command sender may be able to retransmit any command until a response with the same sequence number is received and is processed. Accordingly, a retransmission capability is provided in the case a command packet is lost, corrupted or dropped. In another embodiment, if the sender of commands detects a particular sequence number of a response that has already been received, then the sender of commands may resend all the commands that have not had responses received that follow the latest received sequence number. In yet another embodiment, via a periodic timer, a requestor may verify commands to which have been responded. If a command has not been responded to with a response, then a retransmit of the command may be commenced. The requestor may time-out on any request without a response and may start retransmission after that timer has expired. This may be done, for example, by setting the timeout each time a command is transmitted and each time a response is received. When the timer expires, retransmit may be started if all the outstanding commands have not been responded to with corresponding responses.

Figure 6:
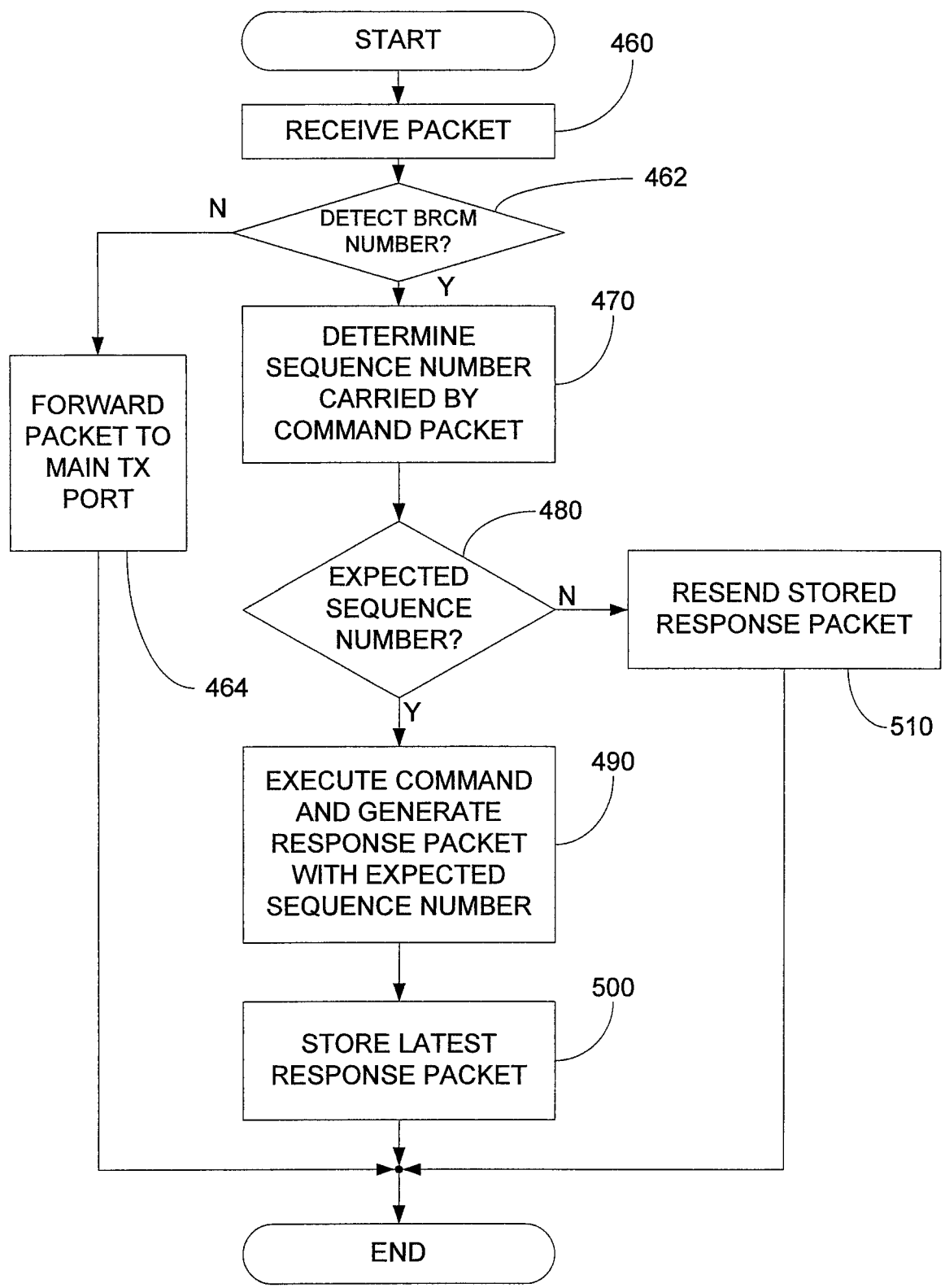
FIG. 6 shows a flowchart illustrating an embodiment of a process for handling response packets according to the present invention.

FIG. 6 shows a flowchart illustrating an embodiment of a process for handling response packets according to the present invention as executed, for example, by the NIC 120. In step 460, a packet may be received. In one embodiment, a command packet may be received by a responder to commands (e.g., the NIC 120) from the sender of commands (e.g., the IMD 110). In query 462, a BRCM number may be detected in a particular field (e.g., an identifier-type field). If the BRCM number is not detected, then, in step 464, the packet may be forwarded to a main transmission port. If the BRCM number is detected, then, in step 470, the sequence number carried by the command packet may be determined. For example, the NIC processor 160 may parse the command packet to determine the sequence number carried by the command packet. In query 480, it may be determined whether the determined sequence number is the expected sequence number. If the determined sequence number is the expected sequence number, then, in step 490, the command may be executed and a response packet may be generated that may include, for example, the expected sequence number. In one embodiment, the NIC processor 160 may configure (e.g., program), for example, one or more filters in the set of filters 170 in light of the received command packet. In step 500, the generated response packet may be stored and returned to the sender of the command packet. In one embodiment, the responder to commands may store only the last response packet sent to the sender of commands. Thus, the latest response packet may be written over the previous response packet or the previous response packet may be deleted or invalidated. In another embodiment, the responder to commands may store one or more response packets sent to the sender of commands.

If the determined sequence number is not the expected sequence number (query 480), then, in step 510, the stored response packet (e.g., the previously stored response packet) may be resent. In one embodiment, if the responder receives a command with a sequence number other than the one expected (e.g., the last one plus one), then the NIC 120 may not execute that command, but instead may send the response for the previously executed command. In another embodiment, the responder to commands may re-execute a command without any adverse effects (e.g., side effects).

In one embodiment, no more than approximately $2^{15}-1$ commands may be outstanding at any time, for example, due to protocol limitations. Memory limitations in the sender may become evident long before the protocol limit is reached. The responder may only keep the last response that was sent so that it might not have any retransmit memory limitations for outstanding packets. However, other limitations may become factors for consideration.

Since the requestor may be the only station saving the outstanding commands, the responder may be able to execute all commands more than once without any adverse effects. Accordingly, the retransmission of a command that exhibits modal effects may cause problems. These modal effects can be avoided by the design of the command packets such that repeated execution has no side effects.

The following are some examples of commands and responses according to an embodiment of the present invention.

Hello—0x0001. The Hello command may solicit a presence response from the NIC 120. The NIC 120 may respond as long as the message is received without error. The command does not make a commitment to work further. The Hello command may be intended for use as a flush command, if needed, possibly during initial negotiation. Error Codes may include, for example, OK.

ID Request—0x0002. The ID Request command may indicate the IMD type and version as a string up to, for example, forty characters long. The response to the ID Request command may return the NIC type and version as a string up to, for example, forty characters long. Error Codes may include, for example, OK; UNAVAIL; BAD_ID; or FATAL Reset To Default—0x0003. The Reset To Default command may request that defaults be set for settings relating to, for example, filters, flow controls, etc. This may be an equivalent state to a reset NIC. Error Codes may include, for example, OK or FATAL.

Set NIC↔IMD Flow Control Method—0x0101. The Set NIC↔IMD Flow Control Method command may set, for example, the flow control method used between, for example, the IMD 110 and the NIC 120. In some embodiments, only symmetrical flow control may be supported in which both ends use the same method. An OK response may indicate that the NIC 120 has set itself to the same flow control method. Settings may include, for example, NONE or PAUSE. Error Codes may include, for example, OK; NOT_SUPPORTED; or FATAL.

Set NIC Drop Policy—0x0102. The Set NIC Drop Policy command may set the drop policy used by the NIC 120 when passing frames to the IMD 110. Settings may include, for example, DROP or BACKPRESSURE. Responses may include, for example, DROP or BACKPRESSURE—setting now in; or DRIVER_CTL—bit set when driver is running and BACKPRESSURE mode could not be selected. Error Codes may include, for example, OK or FATAL.

Set NIC Port—0x0103. The Set NIC Port command may request, for example, that the NIC 120 set the main port to a particular speed. If the main port speed is already at the specified speed, then no action may be taken and the link might not be dropped. The speed may be limited, for example, by power management limitations. Setting the requested speed may jeopardize exceeding the power supply for a particular design. This may not be returned on a card or LAN-on-motherboard (LOM) that may provide enough power in all modes. The speed change may be denied due to the OS driver being loaded. The speed change may be denied because of, for example, interface limits such as Fiber or because an external "in-line" device connected that may not be controlled for some reason. Settings may include, for example, GET, 10, 100, 1000—GET requests that current state be returned with no effect; HD_FLAG—half duplex flag, invalid with 1000 setting; PAUSE—Pause Flow Control Enable Flag; or AUTO—flag indicating that a setting is a "maximum setting" to advertise for auto-negotiation, when set, the link may be dropped as the link is re-negotiated. Responses may include, for example, 10, 100, 1000—speed of link; HD_FLAG—set if link is half duplex; PAUSE—set if pause flow control is enabled; LINK_UP—flag set if link was attained in new mode; FIBER—flag set if fiber connection; PWR_LIMIT—flag set if requested speed was denied due to particular card power limitations; DRV_LIMIT—flag set if request speed was denied due to driver being loaded and forcing link type; INTF_LIMIT—flag is set if requested speed was denied due to limitations in the PHY device (e.g., Fiber that cannot support 10/100); AUTO_NEG—flag is set if link was attained using auto-negotiation; AUTO_NEG_PAR—flag is set if link was attained using auto-negotiation and parallel detection was used to detect link (AUTO_NEG may also be set if this flag is set); CAP10, CAP100, CAP1000—capability advertised by link partner (valid only if AUTO_NEG=1 && AUTO_NEG_PAR=0); CAP_HD_FLAG—capability advertised by link partner (valid only if AUTO_NEG=1 && AUTO_NEG_PAR=0); or CAP_PAUSE—capability advertised by link partner (valid only if AUTO_NEG=1 && AUTO_NEG_PAR=0). Error Codes may include, for example, OK or FATAL.

Drop NIC Port Link—0x0104. The Drop NIC Port Link command may drop a link on the main port if it has not already been dropped. The link may be re-established, for example, by using the Set NIC Port command. Error Codes may include, for example, OK or FATAL.

Filter All Packets—0x0201.

| Byte | 31 | 23 | 15 | 7 |
|---|---|---|---|---|
| 16 | 0x5706 | | Cmd. Seq. Num. | |
| 20 | 0x0201 | | 4 | |
| 24 | 0xFDFEFFFB | | | |
| 28-63 | 0 | | | |

The Filter All Packets command may provide that packets received on the main port may be filtered and may not be delivered to the IMD 110. The command may be used, for example, as a power-up setting and may be used with any filters (e.g., time filters) when reset or re-loaded.

Filter All Packets Response—0x8201.

| Byte | 31 | 23 | 15 | 7 |
|---|---|---|---|---|
| 16 | 0x5706 | | Res. Seq. Num. | |
| 20 | 0x8201 | | 4 | |
| 24 | 0x7DFEFFFB | | | |
| 28-63 | 0 | | | |

Filter based on settings—0x0202. Packets may be filtered according to particular filter settings (e.g., current filter settings).

Set Perfect Match Filter—0x0203. It may set the filters defined by Fnum to the value specified in DA. Legal values for Fnum are 0 and 1. If the "OFF" bit is set, then the specified perfect match filter may be disabled.

| Byte | 31 | 23 | 15 | 7 |
|---|---|---|---|---|
| 16 | 0x5706 | | Cmd. Seq. Num. | |
| 20 | 0x0203 | | 8 | |
| 24 | | DA | | |
| 28 | DA | | OFF | FNum |
| 28 | | Checksum | | |
| 32-63 | 0 | | | |

Set Perfect Match Filter Response—0x8204.

Set Broadcast Filter—0x0205. The Set Broadcast Filter command may be set if broadcast frames should be forwarded to the IMD 110. Settings may include, for example, ON. Error Code may include, for example, OK or FATAL.

Set ARP Filter—0x0206. The Set ARP Filter command may be set if ARP frames should be forwarded to the IMD 110. Settings may include, for example, ON. Error Code may include, for example, OK or FATAL.

Get Statistics—0x0301. The Get Statistics command may request a response with the requested statistics in it. Results may include, for example:

```
u64_t IfHCInOctets;
    /* Collected from emac_rx_stat_ifhcinoctets. */
    /* This is the number of octets received on the interface, including framing
       characters. */
u64_t IfHCOutOctets;
    /* Collected from emac_tx_stat_ifhcoutoctets. */
    /* This is the number of octets that have been transmitted on the interface. */
u64_t IfHCInUcastPkts;
    /* Collected from emac_rx_stat_ifhcinucastpkts. */
    /* This is the number of frames received on the wire that were not dropped due
       to errors that have Unicast Ethernet destination addresses. */
u64_t IfHCInMulticastPkts;
    /* Collected from emac_rx_stat_ifhcinmulticastpkts. */
    /* This is the number of frames received on the wire that were not dropped due to
       errors that have multicast Ethernet destination addresses. */
u64_t IfHCInBroadcastPkts;
    /* Collected from emac_rx_stat_ifhcinbroadcastpkts. */
    /* This is the number of frames received on the wire that were not dropped due to
       errors that have the broadcast Ethernet destination addresses. */
u64_t IfHCOutUcastPkts;
    /* Collected from emac_tx_stat_ifhcoutucastpkts. */
    /* This is the number of packets transmitted that have unicast destination addresses. */
u64_t IfHCOutMulticastPkts;
    /* Collected from emac_tx_stat_ifhcoutmulticastpkts. */
    /* This is the number of packets transmitted that have multicast destination addresses. */
```

-continued

```
u64_t IfHCOutBroadcastPkts;
    /* Collected from emac_tx_stat_ifhcoutbroadcastpkts. */
    /* This is the number of packets transmitted that have the broadcast destination
       address. */
u32_t Dot3StatsCarrierSenseErrors;
    /* Collected from emac_rx_stat_dot3statscarriersenseerrors. */
    /* This is the number of times a false carrier has been detected on the internal
       PHY device. This is indicated from the PHY by asserting RXER while
       RXDV is low when the RXD pins are at a state of 0x0e. */
u32_t Dot3StatsFCSErrors;
    /* Collected from emac_rx_stat_dot3statsfcserrors. */
    /* A IfInErrors value is the sum of this value and <b>Dot3StatsFCSErrors</b> and
       <b>Dot3StatsAlignmentErrors</b>. */
u32_t Dot3StatsAlignmentErrors;
    /* Collected from emac_rx_stat_dot3statsalignmenterrors. */
    /* This is the number of frames received on the wire that have an odd number of
       nibbles and fail FCS check and are of legal length. */
u32_t Dot3StatsSingleCollisionFrames;
    /* Collected from emac_tx_stat_dot3statssinglecollisionframes. */
    /* This is the number of collisions that were followed by successful packet
       transmits. This is the same as the number of packets that were transmitted
       with only one collision. */
u32_t Dot3StatsMultipleCollisionFrames;
    /* Collected from emac_tx_stat_dot3statsmultiplecollisionframes. */
    /* This is the number of packets that have transmitted with more that one collision. */
u32_t Dot3StatsDeferredTransmissions;
    /* Collected from emac_tx_stat_dot3statsdeferredtransmissionsl. */
    /* This is the number of packets that were delayed in transmission because they
       had to wait for a RX packet to complete. */
u32_t Dot3StatsExcessiveCollisions;
    /* Collected from emac_tx_stat_dot3statsexcessivecollisions. */
    /* This is the number of packets that have been dropped due to having 16 collisions
       in a row. */
u32_t Dot3StatsLateCollisions;
    /* Collected from emac_tx_stat_dot3statslatecollisions. */
    /* This is the number of packets that have been dropped due to having a
       collision received after the 64-byte collision window. */
u32_t EtherStatsCollisions;
    /* Collected from emac_tx_stat_etherstatscollisions. */
    /* This is the number of collisions that have been detected on the interface. */
u32_t EtherStatsFragments;
    /* Collected from emac_rx_stat_etherstatsfragments. */
    /* This is the count of frames less than 64 bytes with bad FCS. */
u32_t EtherStatsJabbers;
    /* Collected from emac_rx_stat_etherstatsjabbers. */
    /* This is the number of frames received that exceed the programmed MTU
       size and have bad FCS. */
u32_t EtherStatsUndersizePkts;
    /* Collected from emac_rx_stat_etherstatsundersizepkts. */
    /* This is the number of frames received that are less than 64 bytes in length. */
u32_t EtherStatsOverrsizePkts;
    /* Collected from emac_rx_stat_dot3statsframestoolong. */
    /* This is the number of frames received that exceed the programmed MTU size. */
u32_t EtherStatsPktsRx64Octets;
    /* Collected form emac_rx_stat_etherstatspkts64octets. */
    /* This is the number of good frames received of 64 bytes in size. */
u32_t EtherStatsPktsRx65Octetsto127Octets;
    /* Collected from emac_rx_stat_etherstatspkts65octetsto127octets. */
    /* This is the number of good frames received of 65 bytes to 127 bytes in size. */
u32_t EtherStatsPktsRx128Octetsto255Octets;
    /* Collected from emac_rx_stat_etherstatspkts128octetsto255octets. */
    /* This is the number of good frames received of 128 bytes to 255 bytes in size. */
u32_t EtherStatsPktsRx256Octetsto511Octets;
    /* Collected from emac_rx_stat_etherstatspkts256octetsto511octets. */
    /* This is the number of good frames received of 256 bytes to 511 bytes in size. */
u32_t EtherStatsPktsRx512Octetsto1023Octets;
    /* Collected from emac_rx_stat_etherstatspkts512octetsto1023octets. */
    /* This is the number of good frames received of 512 bytes to 1023 bytes in size. */
u32_t EtherStatsPktsRx1024Octetsto1522Octets;
    /* Collected from emac_rx_stat_etherstatspkts1024octetsto1522octets. */
    /* This is the number of good frames received of 1024 bytes to 1522 bytes in size. */
u32_t EtherStatsPktsRx1523Octetsto9022Octets;
    /* Collected from emac_rx_stat_etherstatspkts1523octetsto9022octets. */
    /* This is the number of good frames received of 1523 bytes to 9022 bytes in size. */
u32_t EtherStatsPktsTx64Octets;
    /* Collected form emac_tx_stat_etherstatspkts64octets. */
    /* This is the number of good frames transmitted of 64 bytes in size. */
```

-continued

```
u32_t EtherStatsPktsTx65Octetsto127Octets;
    /* Collected from emac_tx_stat_etherstatspkts65octetsto127octets. */
    /* This is the number of good frames transmitted of 65 bytes to 127 bytes in size. */
u32_t EtherStatsPktsTx128Octetsto255Octets;
    /* Collected from emac_tx_stat_etherstatspkts128octetsto255octets. */
    /* This is the number of good frames transmitted of 128 bytes to 255 bytes in size. */
u32_t EtherStatsPktsTx256Octetsto511Octets;
    /* Collected from emac_tx_stat_etherstatspkts256octetsto511octets. */
    /* This is the number of good frames transmitted of 256 bytes to 511 bytes in size. */
u32_t EtherStatsPktsTx512Octetsto1023Octets;
    /* Collected from emac_tx_stat_etherstatspkts512octetsto1023octets. */
    /* This is the number of good frames transmitted of 512 bytes to 1023 bytes in size. */
u32_t EtherStatsPktsTx1024Octetsto1522Octets;
    /* Collected from emac_tx_stat_etherstatspkts1024octetsto1522octets. */
    /* This is the number of good frames transmitted of 1024 bytes to 1522 bytes in size. */
u32_t EtherStatsPktsTx1523Octetsto9022Octets;
    /* Collected from emac_tx_stat_etherstatspkts1523octetsto9022octets. */
    /* This is the number of good frames transmitted of 1523 bytes to 9022 bytes in size. */
u32_t XonPauseFramesReceived;
    /* Collected from emac_rx_stat_xonpauseframesreceived. */
    /* This is the number of good MAC control frames received of pause type with
       a back-off value of zero. This register increments regardless of flow control state. */
u32_t XoffPauseFramesReceived;
    /* Collected from emac_rx_stat_xoffpauseframesreceived. */
    /* This is the number of good MAC control frames received of pause type with a
       back-off value other than zero. This register increments regardless of
       flow control state. */
u32_t OutXonSent;
    /* Collected from emac_tx_stat_outxonsent. */
    /* This is the number of MAC Control pause packets of value 0xffff that
       have be transmitted. */
u32_t OutXoffSent;
    /* Collected from emac_tx_stat_outxoffsent. */
    /* This is the number of MAC Control pause packets of value 0 that have
       be transmitted. */
u32_t MacControlFramesReceived;
    /* Collected from emac_rx_stat_maccontrolframesreceived. */
    /* This is the number of good MAC control frames received that are not
       of pause type. */
```

Error Codes may include, for example, OK or FATAL.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A network interface for use with a manager, the network interface comprising:
    a first host network interface controller coupled to a network; and
    a second host network interface controller coupled to the network,
    wherein the manager is coupled to the first network interface controller and the second network interface controller, the manager initially being in two-way communications with the network via the first network interface controller,
    wherein, if the first network interface controller fails, then the manager switches from the first network interface controller to the second network interface controller and is in two-way communications with the network via the second network interface controller,
    wherein, if the first network interface controller operates normally, network traffic does not pass through the first network interface controller to the manager unless the network traffic is management traffic, and
    wherein, if the first network interface controller fails, the network traffic does not pass through the second network interface controller to the manager unless the network traffic is management traffic.

2. The network interface according to claim 1, wherein the first host network interface controller is configured to couple to an Ethernet.

3. The network interface according to claim 2, wherein the first network interface controller initially provides a sole connection to the Ethernet for the manager.

4. The network interface according to claim 2, wherein the first network interface controller and the second network interface controller are part of a server blade.

5. The network interface according to claim 1, wherein the first network interface controller and the second network interface controller are part of a server blade.

6. The network interface according to claim 1, wherein the first network interface controller initially provides a sole connection to the network for the manager.

7. The network interface according to claim 1, wherein the first network interface controller comprises an Ethernet port.

8. The network interface according to claim 1, wherein the first network interface controller comprises one or more filters and a network interface controller processor.

9. The network interface according to claim 8, wherein the manager configures the one or more filters.

10. The network interface according to claim 8,
wherein the manager sends one or more commands to the network interface controller processor, and
wherein the network interface controller processor configures the one or more filters based upon the one or more commands.

11. The network interface according to claim 10, wherein the network interface controller processor responds to a command with a corresponding response to the manager.

12. The network interface according to claim 11, wherein the first network interface controller stores only a latest response to a received and expected command.

13. The network interface according to claim 11, wherein the command and the corresponding response each comprise an identical sequence number.

14. The network interface according to claim 11, wherein the manager stores a particular command until a corresponding response has been received.

15. The network interface according to claim 1, wherein management traffic, commands and responses are passed between the first network interface controller and the manager.

16. The network interface according to claim 1, comprising:
a plurality of additional host network interface controllers, each additional host network interface controller being coupled to the manager,
wherein if the first network interface controller and the second network interface controller fail, then the manager selects a host network interface controller from the plurality of additional host network interface controllers to exclusively provide access to and from the network for the manager.

17. The network interface according to claim 1, wherein the manager is initially in two-way communications with the network exclusively through the first network interface controller.

18. The network interface according to claim 1, wherein, if the first network interface controller fails, then the manager switches from the first network interface controller to the second network interface controller and is in two-way communications with the network exclusively through the second network interface controller.

19. The network interface according to claim 1, wherein the first network interface controller, the second network interface controller and the manager are part of a server system that is coupled to the network.

20. The network interface according to claim 1,
wherein the first network interface controller comprises a first filter,
wherein the second network interface controller comprises a second filter, and
wherein the first filter and the second filter are configurable by the manager.

21. The network interface according to claim 1,
wherein the first network interface controller is coupled to the network via a first switch, and
wherein the second network interface controller is coupled to the network via a second switch.

22. A method of remote management over a network, comprising:
accessing the network via a plurality of host network interface controllers of a local server system;
communicating between a local manager of the local server system and a remote manager over the network through a host network interface controller selected by the local manager, the selected host network interface controller being one of the plurality of host network interface controllers, the local manager not having a dedicated management network interface controller coupled to the network, any of the plurality of host network interface controllers being selectable by the local manager;
managing the local server system via the local manager; and
responding locally to management commands sent over the network from the remote manager.

23. The method according to claim 22, comprising:
sending a response from the local manager to the remote manager.

24. The method according to claim 23, wherein the sent response comprises graphical information.

25. The method according to claim 22, wherein the selected network interface controller provides exclusive access to and from the network for the local manager.

26. The method according to claim 22, wherein the local manager comprises an intelligent management device.

27. The method according to claim 22, comprising:
selecting another host network interface controller of the plurality of host network interface controllers to provide exclusive access to and from the network for the local manager.

28. The method according to claim 22, wherein the network is an Ethernet.

29. The method according to claim 28, wherein the local server system comprises a server blade system.

30. The method according to claim 22, wherein the local server system comprises a server blade.

* * * * *